Nov. 11, 1941.　　　H. B. KAEMPF　　　2,262,587
TAKE-UP DEVICE
Filed Jan. 28, 1941　　　2 Sheets-Sheet 2

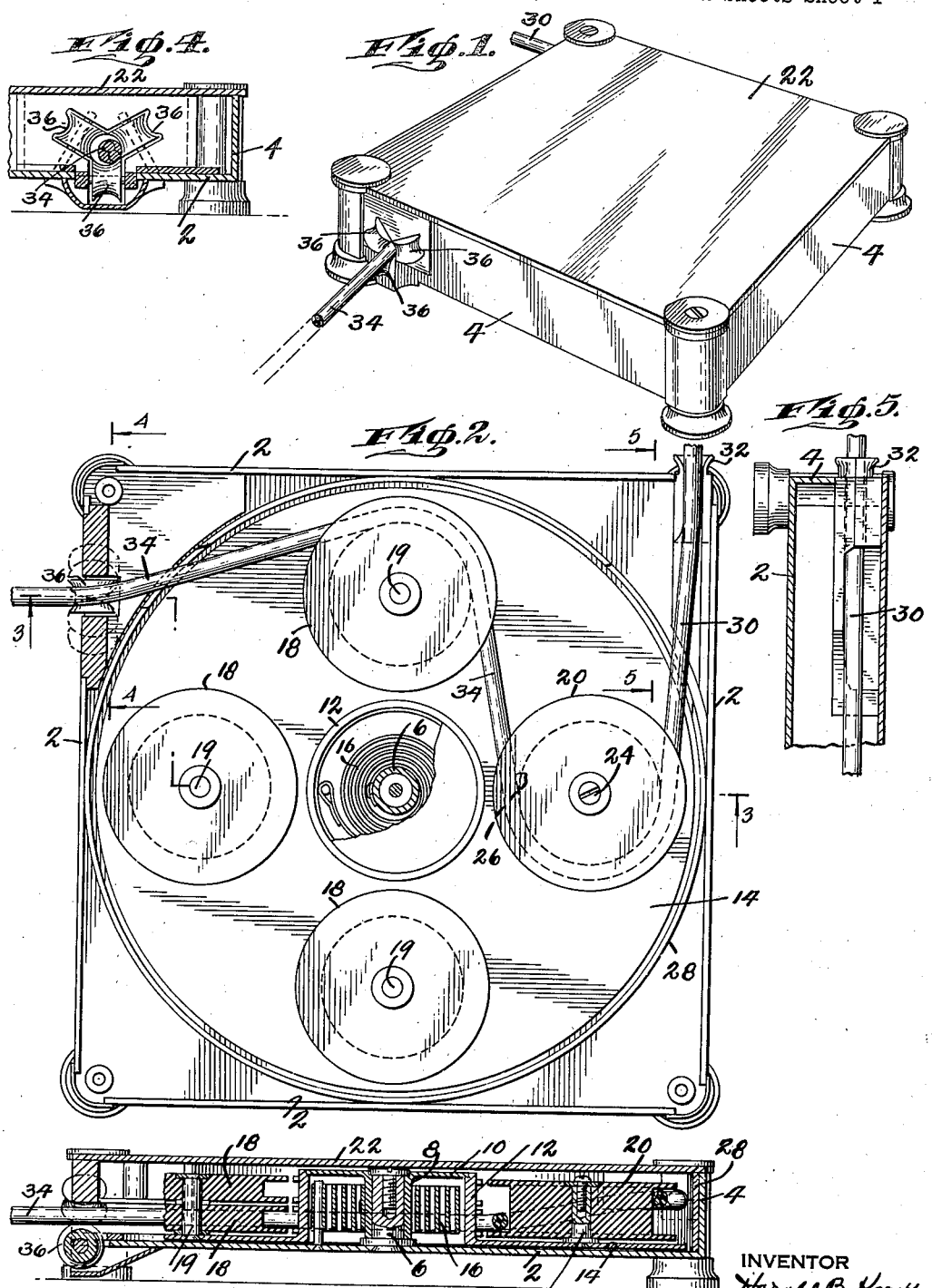

INVENTOR
Harold B. Kaempf
BY
Kiddle, Bithell and Montgomery.
ATTORNEYS

Patented Nov. 11, 1941

2,262,587

UNITED STATES PATENT OFFICE 2,262,587

TAKE-UP DEVICE

Harold B. Kaempf, New York, N. Y., assignor of one-third to Charles Scotson, New York, N. Y., and one-third to Edmund W. Baggott, Brooklyn, N. Y.

Application January 28, 1941, Serial No. 376,269

9 Claims. (Cl. 242—107)

My invention relates to an improvement in take-up devices for any flexible material such, for example, as tape, telephone cords, lamp cords, cords for irons, clothes lines, etc., and has for one of its objects the provision of a simple device for handling such materials in which the flexible material can be readily extended and retracted.

One of the common failings with telephone cords, cords for irons and lamp cords, for example, is twisting of the cord as these instruments are moved about. The present device will eliminate this trouble in that the cord is always under tension.

I want it to be distinctly understood that my device has a great many uses and the fact that I have mentioned tape, telephone cords, lamp cords, cords for irons and clothes lines as specific materials which may be handled by my device is not to be interpreted at all as limiting the use of my device to these specific materials.

Generally speaking my improved device comprises a housing for the reception of the surplus material of the cord or other material being handled, means being provided within this housing whereby the cord may be readily withdrawn therefrom when the cord is to be lengthened and whereby the cord will automatically be taken up when the cord is to be shortened.

The housing and all the parts contained within the housing may be made of metal or plastics or any other suitable material.

In the accompanying drawings:

Fig. 1 is a perspective view of the entire assembly of one embodiment of the invention;

Fig. 2 is a plan view of the device of Fig. 1 with the cover of the housing removed;

Fig. 3 is a section taken substantially on the line 3—3 of Fig. 2;

Fig. 4 is a section on the line 4—4 of Fig. 2;

Fig. 5 is a view on the line 5—5 of Fig. 2;

Figure 6:
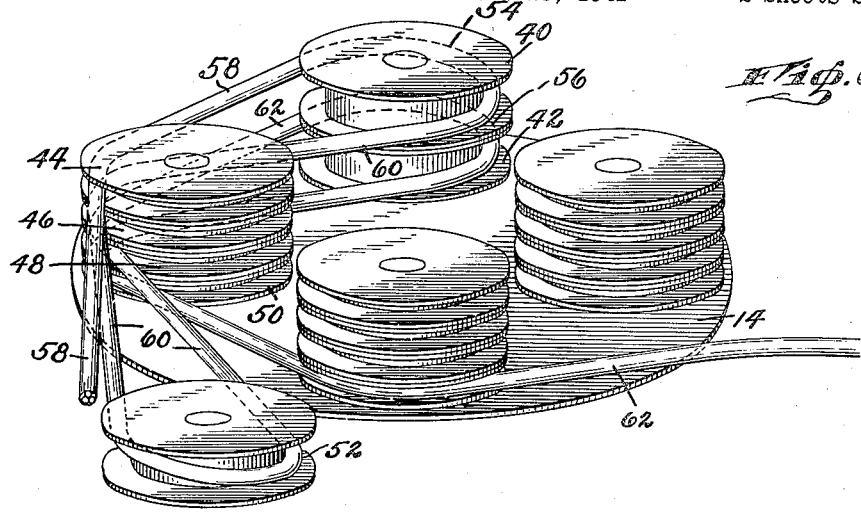
Fig. 6 is a perspective view of another embodiment of the invention.

Referring in detail to Figs. 1 to 5 of the drawings: My invention as here illustrated embodies a housing comprising a base member composed of a bottom 2 and sides 4. Rigidly secured at the center of the bottom 2 is a stud 6 which stands vertically on the inner face of the bottom.

Rotatable on the stud 6 is a sleeve 8 provided at its upper end with a flange 10, this flange constituting the cover plate for an upstanding hub 12 provided on the upper face of a turntable 14 which is mounted within the housing of the device just above the bottom 2 thereof and is supported by and rotatable on the stud 6.

The turntable hub 12 and cover plate 10 constitute a housing for a spiral spring 16, one end of which is made fast to the hub 8 and the other end to the bottom 2 of the housing, as clearly shown in Fig. 3.

Mounted on the turntable 14 adjacent the periphery or rim thereof are a plurality of storage spools 18 and a single anchor or bight spool 20. These are all grooved spools.

The spools 18 are arranged in pairs, one above the other, on studs 19, the two spools of each pair being free to rotate on their stud independently of each other.

The studs 19 for the storage spools and the stud 21 for the anchor spool stand perpendicular to the face of the turntable 14 and as the turntable is rotated about the stud 6 the storage and anchor spools have a planetary motion about this stud.

It is one of the objects of this invention to provide a device wherein it is not necessary to cut the cord or other flexible material to be handled or to make the same fast to the device, so that, for example, this improved equipment may be quickly attached to the receiver cord of a telephone or to the cord of an electric lamp without disturbing the operation of either one of these devices even momentarily, a further object being the provision of a construction wherein one lead of the material being handled may be stationary, that is, not moved into and out of the housing.

In order that the cord or other material being handled may be applied to the device without cutting the cord, the housing is provided with a removable cover 22. The anchor spool or bight spool 20 is removably mounted on its stud 21, upon which it may be held by a screw 24, for instance.

Suppose by way of example my device is to be applied to the receiver cord of a telephone: It is simply necessary to remove the cover 22, and the bight spool 20. The bight 26 of the cord is then slipped over the bight spool, and the spool replaced on its stud with the lead 30 of the bight lying between the spool and the fixed guard 28 which surrounds the periphery of the turntable. The lead 30 is led out through guide 32 provided in the side of the housing. The other lead 34 of the bight is passed around the lower spool of the immediately adjacent pair of storage spools 18 and out through another guide in the side of the housing, this guide being provided with anti-friction devices which may take the form of rollers 36, as illustrated in Fig. 4.

When applying the bight 26 to the spool 20 the turntable is rotated anticlockwise to store energy in the spring 16 and to bring the spool 20 adjacent the outlet 32 in the housing of the device. The cover of the housing is now placed in position again and upon release of the tension on the cord the turntable will rotate in a clockwise direction, as viewed in Fig. 2, under the action of the spring 16, and the upper lead 30 of the bight will engage the upper storage spool of each pair of spools 18, while the lower lead 34 will engage the lower spool of each pair. As each spool is grooved and as each bight lead runs upon its own spools, the two leads are maintained separated from each other and twisting of the same prevented. When the instrument, such as a telephone receiver, to which the cord is attached is moved relatively to the other end of the cord, the lead 34 is simply drawn out of the housing, this movement being permitted by rotation of the turntable in an anticlockwise direction and the movement of this lead without the necessity of movement of the lead 30 being permitted by reason of the fact that each lead runs about its own storage spools which are rotatable independently of the storage spools for the other lead. Of course if both leads of the bight are to be withdrawn from and retracted into the housing simultaneously this is also possible.

It will be seen from all of the foregoing that my device is simple in operation and that friction on the material being handled has been reduced to the minimum.

Figure 7:
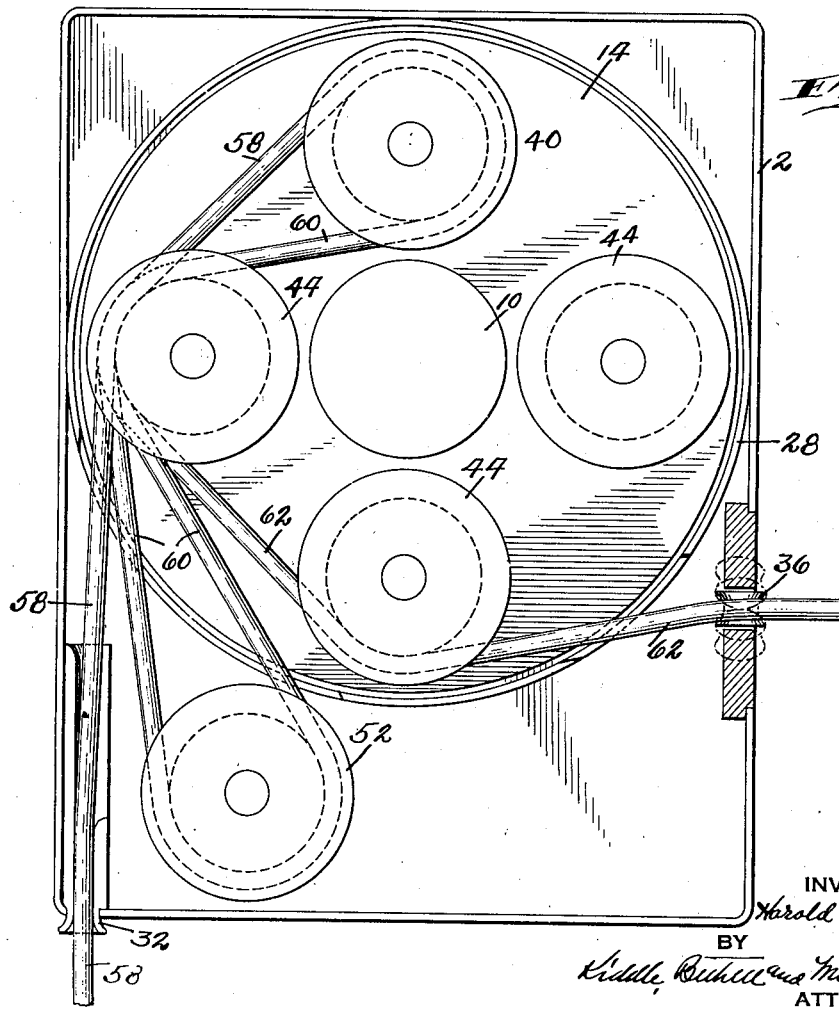
Fig. 7 is a plan view of the same.

It will be appreciated that the storage capacity of my device is limited by its size so in order to increase its capacity, but without materially increasing its overall dimensions, I provide the construction illustrated in Figs. 6 and 7.

In effect I have doubled the capacity of the device by increasing the number of bight spools and the storage spools in each stack.

In this embodiment of the invention I provide the housing and spring driven turntable 14 as before. Two anchor or bight spools, however, are provided in this embodiment of the invention, these spools being in superimposed relation upon their supporting stud. For the sake of clarity of description these spools are designated 40 and 42, respectively. These anchor spools, it is to be understood, are freely rotatable relatively to each other. I also provide stacks of storage spools corresponding to the spools 18, there being twice as many spools in each stack, however, as in the embodiment of the invention illustrated in Figs. 1 to 5. These spools have been designated 44, 46, 48 and 50, respectively, and are rotatable relatively to each other.

Within the housing of the device but beyond the turntable 14 is an idler pulley 52.

The housing, as before, is provided with outlets in the housing sides through which the material being handled is led.

In using this embodiment of my invention, the anchor spools 40 and 42 are removed and bights 54 and 56 slipped over them. The lead 58 of the upper bight 54 is led about the upper immediately adjacent storage spool 44 and out the housing outlet 32. The other lead 60 of the same bight passes about the next lower storage spool 46 and around idler pulley 52 back around storage spool 48 and from thence about anchor spool 42 to form the bight 56. The lead 62 of the bight 56 passes about the lowermost storage spool 50 and from thence to the exterior of the housing past the anti-friction rollers 36. As the turntable is rotated in the take-up operation it will be quite evident that the cord will pass about the other stacks of storage spools in the same order as about the stack immediately adjacent the anchor spools, so that the various leads will be kept apart and all twisting avoided.

The same advantages accrue to having all of the spools independently rotatable as in the first embodiment described, with respect to reduction of friction and ability to draw the lead 62 out of the housing while the lead 58 remains stationary, or to draw both leads out simultaneously.

It will be appreciated that while in both embodiments of my invention I have illustrated the same as horizontally disposed, they are equally operable in any position.

It is to be understood that changes may be made in the details of construction and arrangement of parts hereinabove described within the purview of my invention.

What I claim is:

1. A take-up device comprising in combination, a driven turntable, a single grooved bight-receiving or anchor spool and a pair of cooperating storage spools mounted on said turntable to one side of the axis of rotation thereof, the storage spools being superimposed and the height of said single grooved spool being substantially the same as the combined heights of the storage spools.

2. A take-up device comprising in combination, a spring driven turntable, a peripheral guard therefor, a single grooved anchor or bight spool and a cooperating pair of superimposed storage spools mounted on the face of said turntable within the confines of said guard and offset with respect to the axis of rotation of the turntable, the height of the anchor or bight spool being substantially equal to the combined heights of the storage spools.

3. A take-up device comprising in combination, a single grooved anchor or bight spool and a plurality of superimposed storage spools, the height of the superimposed spools being substantially the same as that of the said anchor spool, and means for imparting planetary movement to all of the spools about a common axis simultaneously.

4. A take-up device comprising in combination, a plurality of spools having planetary movement about a common axis, one spool constituting an anchor spool for receiving the bight of a length of material to be taken up, the other spools which constitute storage spools being superimposed and having peripheral grooves, the grooves of the upper storage spools receiving one of the two leads of the bight passing from the anchor spool, the groove of the lower storage spool receiving the other lead of the said bight, the height of the superimposed spools being substantially the same as that of the anchor or bight spool.

5. A take-up device comprising in combination, a turntable, an anchor or bight spool mounted on the turntable adjacent the rim or edge thereof, a stationary guard about the rim or edge of the turntable, a plurality of superimposed storage spools also mounted on the turntable, the anchor spool having a single groove and equal in height to the superimposed storage spools, the anchor spool being adapted to receive the bight of the material to be taken up, the storage spools each receiving one lead of the bight directly from the anchor spool when the material is wound, and a spring for driving the turntable, the spring being tensioned by applying tension to the material to be taken up in a direction to impart planetary motion to all of the spools and to strip the material from the storage spools, whereby upon release of the tension the material will automatically restore itself to its original position with respect to the spools.

6. A take-up device comprising in combination, a housing, guideways leading through the sides of the housing, a turntable within the housing, an anchor or bight spool and a plurality of storage spools mounted on the turntable and given a planetary motion about the center of the turntable as the latter is rotated, said storage spools being superimposed with respect to each other, the anchor spool receiving the bight of the material to be taken up, and the storage spools receiving the two leads of the bight passing into and out of the housing through said guideways when the material is withdrawn from the device and receiving the two leads of the bight directly from the anchor spool when the material is wound on the spools.

7. A take-up device comprising in combination, a housing, an anchor or bight spool and superimposed storage spools mounted within the housing and having a planetary motion about a common axis, guideways in the sides of the housing for guiding the two leads of a bight, the bight being received only by the anchor spool, as the material of the bight is drawn into and out of the said housing, and anti-friction means for one of said guideways.

8. In combination, a length of flexible material, a turntable, an anchor or bight spool mounted thereon, a bight of said flexible material being received by said anchor spool only, a plurality of storage spools also mounted upon said turntable, all of said spools being offset from the axis of rotation of the turntable, the storage spools being disposed in pairs with the spools of each pair superimposed, whereby as the turntable is rotated each lead of the bight will pass directly from the anchor spool about its individual storage spool, the storage spools being independently rotatable whereby the material may be pulled therefrom by simply exerting tension on one lead of the bight in a direction to effect backward rotation of the turntable.

9. In a take-up device for flexible materials, the combination of a turntable, a pair of independently rotatable and superimposed bight spools mounted thereon, at least four storage spools also mounted on said turntable, said storage spools being superimposed and independently rotatable, and a cooperating idler spool rotatably mounted adjacent the turntable, a housing for said turntable and spools, and guideways leading into the housing.

HAROLD B. KAEMPF.